Nov. 15, 1938.                M. G. HILL                2,136,920
                             FLUID CLUTCH
                        Filed July 27, 1937            2 Sheets-Sheet 2

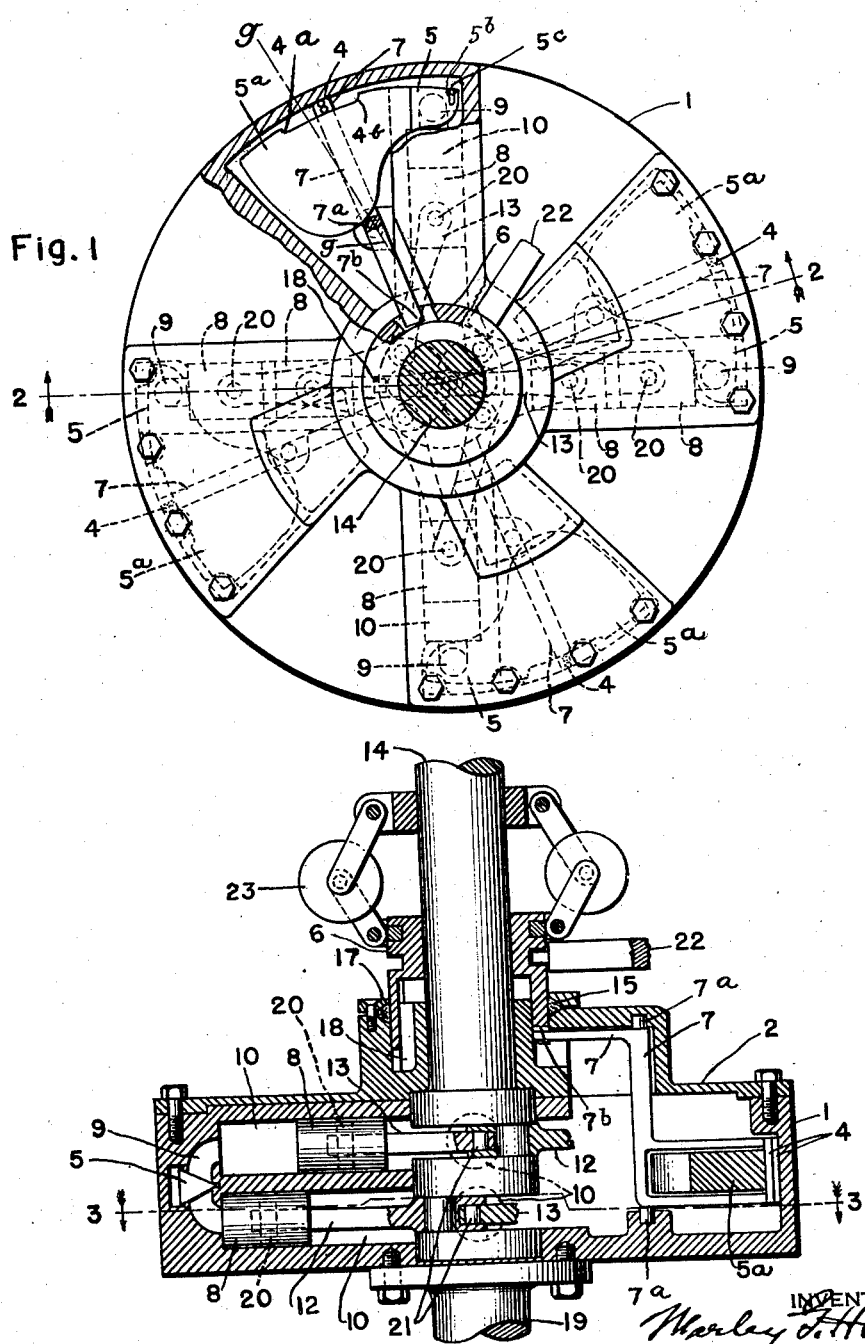
Nov. 15, 1938.  M. G. HILL  2,136,920
FLUID CLUTCH
Filed July 27, 1937  2 Sheets-Sheet 1

INVENTOR
Marley G. Hill
BY
Walter H. Humphrey
ATTORNEY

Patented Nov. 15, 1938

2,136,920

UNITED STATES PATENT OFFICE 2,136,920

FLUID CLUTCH

Marley G. Hill, Brooklyn, N. Y.

Application July 27, 1937, Serial No. 155,883

9 Claims. (Cl. 192—60)

This invention relates to a fluid clutch, applicable for use wherever it is desired to transmit power from a driving shaft to a driven shaft and to maintain, vary or prevent relative rotation between the shafts.

An important feature of the invention consists in employing a variable fluid pressure system as a transmission link connecting driving and driven shafts, in which, at zero pressure, the system operates as a lost-motion outlet, absorbing the drive and cutting off transmission and as the fluid pressure in the system is increased, lost motion is proportionately decreased and transmission is effected at increasing speed until the fluid pressure reaches maximum, when a full drive is attained at a 1 to 1 ratio.

Provision is made for regulating the fluid pressure in the system automatically through centrifugal action which, by manual control, may be entirely eliminated to stop or start transmission or varied to quickly or gradually obtain maximum pressure in the system and resulting transmission at a 1 to 1 ratio.

The means employed to obtain centrifugal action, the manner of utilizing it and its regulation and control, constitute important features of the invention.

As applied to automobiles, the invention has many advantages, as the clutch may be manually adjusted and set to obtain transmission at a 1 to 1 ratio either quickly or gradually and starting, stopping and varying transmission, becomes a mere matter of regulating the supply of gas to the motor which makes the operation very simple and as no gearing or friction elements are employed, it is noiseless.

In addition to the above mentioned features of the invention, there are various structural improvements of importance which will be brought to attention in the detail description which follows.

A fluid clutch, constructed in accordance with my invention, is illustrated in the accompanying drawings but I do not wish to be understood as intending to limit myself to either the exact form or details shown, as various changes may be made therein without departing from the spirit and scope of the invention, as outlined in the appended claims.

In the drawings—

Fig. 1 is a view in end elevation, looking at the driven shaft end of the clutch with portions of the casing broken away to show one of the weighted valves and its adjustable fulcrum.

Fig. 2 is a substantially horizontal section, on the line 2—2 of Fig. 1.

Figure 3:
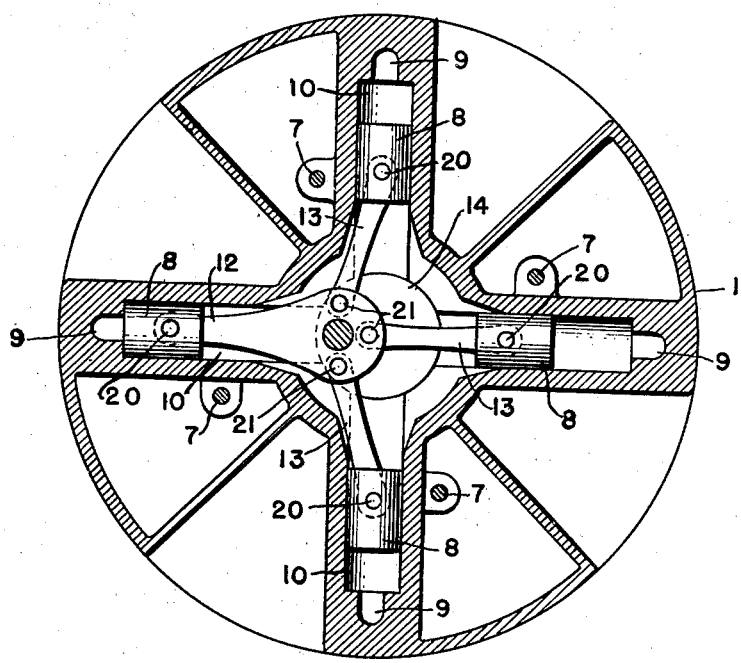
Fig. 3 is a vertical cross section on the line 3—3 of Fig. 2.
Figure 4:
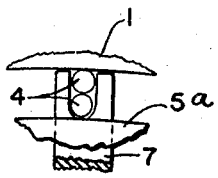
Fig. 4 is a detail view, on a larger scale, of the upper end of an adjustable pivot-carrying lever employed with each of the valve-operating weights.

Referring now to the drawings, the driving shaft is indicated at 19, and the driven shaft, at 14, with the fluid clutch 1 interposed between and operatively connecting their separated ends, which are axially aligned, as shown in Fig. 2. The clutch casing is bolted fast to a terminal flange of the driving shaft, and is designed to serve as a flywheel. The driven shaft terminates within the clutch casing in a double crank formation, with the cranks oppositely disposed.

Through a main connecting rod 12, having three auxiliary connecting rods 13 pivoted thereto at 21 (see Fig. 3), each crank of the driven shaft is connected, as indicated at 20, to four pistons 8, which work in cylinders 10, formed interiorly of the clutch casing.

The four-cylinder arrangement with the pistons and connecting rods, is the same for each crank but as the cranks are oppositely disposed to each other, the two sets of pistons are correspondingly positioned. Adjoining cylinders of the two sets of pistons are connected in pairs by means of communicating passages, indicated at 9, and the fluid is pumped back and forth when the passages are open, from one cylinder to the other cylinder of each pair. This pumping action results from rotation of the clutch casing which, due to the eccentricity of the piston mounting, therein, gives the pistons reciprocating motion with respect to the cylinders. In this operation, the pump cylinder elements and pump piston elements are rotated together by the driving shaft but they turn about different centers, the cylinder elements about the axis of the driving shaft and the piston elements about the axis of the crank pins of the driven shaft. The distance between these centers determines the length of the piston stroke in the cylinders.

As long as the communicating passages 9, between cooperating cylinders, remain open, that is to say, practically unobstructed, no motion will be transmitted to the driven shaft, as there will be no objectionable resistance to the flow of fluid from one cylinder to the other and, in the absence of fluid pressure, the pistons, under the rotating action of the clutch casing, will reciprocate idly with respect to the cylinders, and thus serve as a lost-motion outlet cutting off transmission to the driven shaft. The clearance shown in the drawings for the movement of the valves to open the communicating passages between the cylinders is considered sufficient for all practical purposes but may be increased more or less if found necessary or desirable.

Under the above stated conditions of no transmission, the two cranks of the driven shaft act, in effect, as fixed pivots about which, as centers, the two sets of pistons and connecting rods are carried in a circular path by the rotating clutch casing and as this path is eccentric to the path traveled by the cylinder formation of the casing, there will be relative reciprocation between the pistons and cylinders to compensate for the eccentricity, so that both may rotate together without transmitting motion to the driven shaft, regardless of the speed of the driving shaft.

To obtain transmission, provision is made for simultaneously obstructing the flow of fluid between cooperating cylinders to create fluid pressure in the cylinders and thereby check reciprocation of the pistons. The effect of this action is to lock the pistons and cylinders together against independent movement and cause the piston assemblies to shift their rotating centers from the crank pins of the driven shaft to the axis of the driving shaft and so give motion through the cranks to the driven shaft. Transmission at low, high or any intermediate speed depends upon whether the obstruction to the flow of fluid between the cylinders is partial or complete. If the obstruction is only partial, the pistons will continue to reciprocate with respect to the cylinders but the speed of reciprocation will be reduced. The lost motion resulting from any reciprocation of the pistons will have the effect of cutting down the transmission and reducing the speed of the driven shaft. To obtain high speed transmission, the flow obstruction between cylinders must be complete, in which case, no reciprocation of the pistons occurs and there being no lost motion, the drive will be in a 1 to 1 ratio.

For the purpose of controlling the fluid flow between each pair of cooperating cylinders, a valve 5 is employed in each communicating passage 9 and is normally held open by a weight 5ª, preferably formed in part with the valve. A guide groove is formed in the valve at 5ᵇ and cooperating with the groove there is a fixed pin 5ᶜ which, while permitting free opening and closing movement of the valve, holds it properly positioned in the communicating passage 9 between the cylinders. The weight is designed, in shape and mounting, to be actuated centrifugally to give the valve closing motion and this action may be regulated and controlled either manually or automatically, by adjusting the pivot for the weight which is here shown as a pair of rollers 4, carried by a lever 7. The lever is pivoted at 7ª and is connected through a cam sleeve 6, keyed at 18 to slide on the driven shaft, to be given movement manually by a hand or foot lever 22 or automatically by a governor 23, to shift the weight pivot levers back and forth as required.

Figure 6:
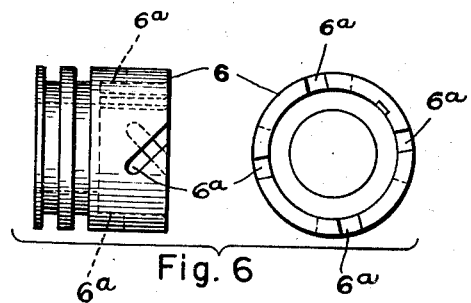
Fig. 6 shows side and end views of a cam sleeve for adjusting the valve weight pivot levers, which is slidingly mounted on and rotates with the driven shaft.
Figure 5:
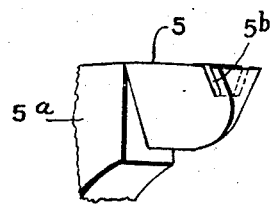
Fig. 5 is a detail perspective view of one of four similar valves of the clutch, each of which is constructed as a terminal formation of its operating weight.

As shown in Fig. 6, the sleeve 6 is provided with four equi-spaced cam grooves 6ª, 6ª, extending at about 45 degrees to the axis of the driven shaft. These grooves are engaged by the ends of the pivot lever 7, as shown in Figs. 1 and 2 and as the sleeve is moved back and forth axially of the shaft, the pivot levers will be given corresponding movement about their pivots 7ª in a manner well known in the art. The sleeve 6 is provided with separate grooves, one of which is engaged by the shaped end of the lever 22 and the other by a ring member of the governor 23, as shown in Fig. 2.

The lever 7 is forked to extend upward on opposite sides of the weight and the ends of the fork, projecting above the weight, are notched to receive the rollers 4. The upper roller is an idler and contacts with the inner peripheral face of the clutch casing, having movement thereon between two stop shoulders 4ª, 4ᵇ of the weight, by which the adjustment of the pivot lever 7 is limited. The lower roller, which serves as the pivot proper, or fulcrum, rides in a shallow depression formed in the upper surface of the weight between the stop shoulders, which follows the curvature of the inner peripheral face of the clutch casing.

When the four pivot-adjusting levers are shifted by movement of the cam sleeve more towards the stops 4ª than is shown in Fig. 1, in full lines, the roller pivots will be brought into line with the center of gravity of the weights, which line is indicated approximately and marked g—g and under this adjustment, the weights will be perfectly balanced, and centrifugal force, resulting from rotation of the clutch casing, will have no valve actuating effect upon them. Their balanced position on the pivots will prevent tilting of the weights which would cause the valved ends thereof to close or partly close the communicating passages between the cylinders and the valves therefore remain open.

The above described adjustment is used when no transmission is desired from the driving to the driven shaft and the engine is running above idling speed.

By moving the pivot levers towards the stops 4ᵇ, away from the center of gravity of the weights, the latter, when acted upon by centrifugal force, will be given movement about the pivots 4, in a direction to close or partially close the valves 5, depending upon the extent of movement given the pivot levers and the speed of rotation of the clutch casing.

Full movement of the pivots against the stops 4ᵇ locks the valves closed and produces instant transmission at a 1 to 1 ratio. By moving the pivots gradually towards the stops 4ᵇ, transmission started at low speed may be slowly increased until a 1 to 1 drive is obtained and by reversing the movement of the pivot levers, again reduced to low or, if a 1 to 1 drive is desired at an intermediate speed, the levers are shifted to the required intermediate point and the motor is speeded up by increasing the supply of gas. If the load on the driven shaft varies temporarily, the valve weights, under the action of centrifugal force, will tend to hold the valves closed and automatically maintain transmission at 1 to 1 ratio, without requiring adjustment of the pivot levers. If an overload continues for any considerable length of time so that transmission drops below a 1 to 1 ratio, readjustment of the pivot levers will be required either manually, by shifting the hand or foot lever or automatically by speeding up the engine until sufficient centrifugal force is developed to cause the weights to close the valves.

With the clutch applied to the automobile, the ordinary practice is to adjust the weight pivots by means of the hand or foot lever, to the point that fixes the 1 to 1 drive at a predetermined speed and without further adjustment or attention to the clutch, the operator of the vehicle is free to start, stop and vary transmission as desired. This is done in the usual manner by regulating the supply of gas to the motor. With the engine turning at idling speed of approximately 500 R. P. M. there would be no transmission to the driven shaft, as the centrifugal force developed at that speed would not be sufficient to affect the weights and the drive would be converted into lost motion by the reciprocating action of the clutch cylinders and pistons. As the motor is speeded up by increasing the supply of gas, the valve weights, acted upon by centrifugal force, will be given movement about their pivots and, depending upon the setting of the pivots, will slowly or quickly close the valves and transmission will follow at a 1 to 1 ratio.

In the present embodiment of the invention, two cooperating piston and cylinder assemblies are shown but it will be understood that the number may be varied as desired, as may also the number of cylinder-piston units in each assembly, without departing from the principle of operation or the result obtained.

As the operation and many important advantages of the invention will be apparent from the foregoing, it will not be necessary to further describe the same.

Having described my invention, I claim:

1. A variable transmission link between a driving and a driven shaft comprising a cylinder and piston type of fluid pumping system in which the pump piston elements of the system are carried by one shaft and the pump cylinder elements by the other shaft, the two sets of elements being rotatable together by the driving shaft without transmitting motion to the driven shaft, such rotation of the elements being about different centers spaced apart to cause the piston elements to reciprocate in rotation with respect to the cylinder elements, pivotally mounted valves centrifugally actuated for varying the flow of fluid to and from the cylinders to regulate the aforesaid reciprocation and establish transmission from the driving to the driven shaft and means for shifting the valve pivots to vary the centrifugal actuation of the valves.

2. A variable transmission link between a driving and a driven shaft comprising a cylinder and piston type of fluid pumping system in which the pump piston elements of the system are carried by one shaft and the pump cylinder elements by the other shaft, the two sets of elements being rotatable together by the driving shaft without transmitting motion to the driven shaft, such rotation of the elements being about different centers spaced apart to cause the piston elements to reciprocate in rotation with respect to the cylinder elements, pivotally mounted valves centrifugally actuated for varying the flow of fluid to and from the cylinders to regulate the aforesaid reciprocation and establish transmission from the driving to the driven shaft and means operable manually and automatically for shifting the valve pivots to vary the centrifugal actuation of the valves.

3. A variable transmission link between a driving and a driven shaft comprising a cylinder and piston type of fluid pumping system in which the pump piston elements of the system are mounted in separate groups eccentrically upon the driven shaft and the pump cylinder elements similarly grouped are mounted in concentric relation upon the driving shaft and connected in cooperating pairs by communicating passages between cylinders of different groups, the said piston and cylinder elements being rotatable together by the driving shaft without transmitting motion to the driven shaft when the aforesaid communicating passages are open, and valves in the passages individually provided with centrifugal actuating means for varying the flow of fluid between cooperating pairs of cylinders.

4. A variable transmission link between a driving and a driven shaft comprising a cylinder and piston type of fluid pumping system in which the pump piston elements of the system are mounted in separate groups eccentrically upon the driven shaft and the pump cylinder elements similarly grouped are mounted in concentric relation upon the driving shaft and connected in cooperating pairs by communicating passages between cylinders of different groups, the said piston and cylinder elements being rotatable together by the driving shaft without transmitting motion to the driven shaft when the aforesaid communicating passages are open, valves in the passages individually weighted for centrifugal actuation independently of each other for varying the flow of fluid between cooperating pairs of cylinders, and means controlling the centrifugal operation of the valves.

5. A variable transmission link between a driving and a driven shaft comprising a cylinder and piston type of fluid pumping system in which the pump piston elements of the system are mounted in separate groups eccentrically upon the driven shaft and the pump cylinder elements similarly grouped are mounted in concentric relation upon the driving shaft and connected in cooperating pairs by communicating passages between cylinders of different groups, the said piston and cylinder elements being rotatable together by the driving shaft without transmitting motion to the driven shaft when the aforesaid communicating passages are open, control valves in the passages pivoted and weighted for centrifugal operation, and means for shifting the valve pivots to vary the centrifugal operation of the valves.

6. A variable transmission link between a driving and a driven shaft comprising a cylinder and piston type of fluid pumping system in which the pump piston elements of the system are mounted in two groups spaced apart and diametrically disposed in eccentric relation upon the driven shaft and the pump cylinder elements similarly grouped are mounted in concentric relation upon the driving shaft and connected in cooperating pairs by communicating passages between cylinders of different groups, the said piston and cylinder elements being rotatable together by the driving shafts without transmitting motion to the driven shaft when the aforesaid communicating passages are open, control valves in the passages pivoted and weighted for centrifugal operation, and means for shifting the valve pivots to vary the centrifugal operation of the valves.

7. An actuating device, comprising a weighted element movable about a fulcrum in response to centrifugal force, and means for holding the aforesaid element against such movement and inoperative by adjusting the fulcrum to maintain the weighted element in balanced relation thereon and effectively unresponsive to centrifugal force.

8. An actuating device, comprising a weighted element movable about a fulcrum in response to centrifugal force, and means for adjusting the fulcrum to and away from a point in line with the center of gravity of the weighted element to vary its response to centrifugal force.

9. An actuating device, comprising a weighted element movable about a fulcrum in response to a centrifugal force, means for adjusting the fulcrum to maintain the weighted element balanced thereon against movement about the same and effectively unresponsive to centrifugal force or unbalanced thereon effectively and responsive to centrifugal force, and a remote control for the fulcrum adjusting means.

MARLEY G. HILL.